(12) United States Patent
Maeki

(10) Patent No.: US 7,170,252 B2
(45) Date of Patent: Jan. 30, 2007

(54) LOCATION AWARE AUTOMATA

(75) Inventor: Akira Maeki, San Jose, CA (US)

(73) Assignee: Renesas Technology Corporation, Tokyo (JP)

( * ) Notice: Subject to any disclaimer, the term of this patent is extended or adjusted under 35 U.S.C. 154(b) by 528 days.

(21) Appl. No.: 10/626,123

(22) Filed: Jul. 23, 2003

(65) Prior Publication Data

US 2005/0022273 A1    Jan. 27, 2005

(51) Int. Cl.
*G05D 1/00* (2006.01)
*B25J 19/02* (2006.01)

(52) U.S. Cl. ............ 318/580; 318/568.12; 318/568.16; 180/168; 56/10.2 F; 700/245; 700/258

(58) Field of Classification Search ............... None
See application file for complete search history.

(56) References Cited

U.S. PATENT DOCUMENTS

| | | | | |
|---|---|---|---|---|
| 4,119,900 | A  * | 10/1978 | Kremnitz | 901/1 |
| 5,353,224 | A  * | 10/1994 | Lee et al. | 701/25 |
| 5,363,305 | A  * | 11/1994 | Cox et al. | 901/1 |
| 5,537,017 | A  * | 7/1996 | Feiten et al. | 318/568.12 |
| 6,108,597 | A  * | 8/2000 | Kirchner et al. | 318/587 |
| 6,255,793 | B1 * | 7/2001 | Peless et al. | 318/580 |
| 6,282,526 | B1 * | 8/2001 | Ganesh | 706/8 |
| 6,442,476 | B1 * | 8/2002 | Poropat | 701/207 |
| 6,469,628 | B1 | 10/2002 | Richards et al. | |
| 6,690,134 | B1 * | 2/2004 | Jones et al. | 318/567 |
| 6,738,313 | B2 * | 5/2004 | Fortuna et al. | 367/100 |
| 6,763,282 | B2 * | 7/2004 | Glenn et al. | 700/245 |
| 6,781,338 | B2 * | 8/2004 | Jones et al. | 318/567 |
| 6,809,490 | B2 * | 10/2004 | Jones et al. | 318/568.12 |
| 6,862,497 | B2 * | 3/2005 | Kemp et al. | 700/264 |
| 6,879,878 | B2 * | 4/2005 | Glenn et al. | 318/568.11 |
| 2004/0111184 | A1 * | 6/2004 | Chiappetta et al. | 700/245 |

OTHER PUBLICATIONS

*Roomba Intelligent FloorVac*, product information and user manual, IRobot, Corp, Burlington, MA (2003).
*Electrolux/Toshiba Trilobite Automatic Vacuum Cleaner*, product information and user manual, Electrolux Home Products—North America, Peoria Illinois & Toshiba Corporation, Tokyo, Japan (2003-2004).

* cited by examiner

*Primary Examiner*—Lincoln Donovan
*Assistant Examiner*—Eduardo Colon Santana
(74) *Attorney, Agent, or Firm*—Townsend and Townsend and Crew LLP

(57) ABSTRACT

An automaton configured to perform a task comprises a communication interface to communicate positional information with one or more anchor points provided within a given environment. The positional information enables generation of mapping information of the given environment. A motor provides the automation with mobility. A memory stores the mapping information. A controller controls the motor to enable the automaton to perform the task in the given environment using a first task route that has been generated using the mapping information.

21 Claims, 5 Drawing Sheets

LOCATION AWARE AUTOMATA

BACKGROUND OF THE INVENTION

The present application relates to an automaton, more particularly, an automaton that is configured to be aware of its location in a given environment in order to perform a task.

An automaton is a self-operating device, e.g., a robot. Generally, an automaton includes a body, a motor, and a controller. The body houses the motor and the controller. The motor includes moving parts to move at least a portion of the automaton from one place to another. Some automata may be placed on a fixed position and have selected movable parts, e.g., an arm of a welding robot that is used in an automobile industry. Alternatively, the entire body or housing or the automaton is moved by the motor, e.g., R2D2 in the movie Star Wars. The controller controls the motor and other moving parts of the automaton to move the automaton according to a predetermined algorithm or commands issued by a user.

Automata have increasingly been gaining popularity among consumers and commercial users. For example, Roomba™, a self-propelled, self-navigating sweeper-vacuum cleaner, manufactured by Takara is currently in market. Another example is an automatic sweeper called "Trilobite," Model number ECL-TR1® from Toshiba. Such automata clean rooms by a "brute force" algorithm. That is, it is propelled in a straight direction until an obstacle is encounters, whereupon it changes to another direction that is not blocked by the obstacle.

Accordingly, such an automaton moves to any open path without being aware of its position or that of objects in the room. As a result, the device may be cleaning the same area multiple times and leave certain areas not cleaned, thereby requiring more time to clean a given room and consuming more energy. It is also possible for such "dumb" devices to enter into an infinite loop, thereby wasting time and energy.

BRIEF SUMMARY OF THE INVENTION

Embodiments of the present invention relates to a location aware automaton and methods of using it to perform one or more tasks. The tasks or functions that the automaton may perform includes cleaning the floor (e.g., sweeping or vacuuming), painting a given area, mowing the lawn, moving in a given path until a request is made, moving to a given location requested by a user, and the like. In one embodiment, the automaton is provided with location awareness capabilities using Ultra Wideband ("UWB") technology, which offers positional information of an object in the order of several centimeters to provide navigational information including collision avoidance.

With the utilization of task routes, the automaton can do the same job much more efficiently by mapping the obstacles in the room and determining the most effective route to clean. Accordingly, the automaton of the present embodiment consumes less energy to perform the same task as the conventional automatic cleaners and requires less time to clean the same area, while reducing the chance of leaving an unswept area.

In one embodiment, an automaton configured to perform a task comprises a communication interface to communicate positional information with one or more anchor points provided within a given environment. The positional information enables generation of mapping information of the given environment. A motor provides the automation with mobility. A memory stores the mapping information. A controller controls the motor to enable the automaton to perform the task in the given environment using a first task route that has been generated using the mapping information.

In another embodiment, an automated system for performing a task in a given environment includes a plurality of anchor points configured to transmit and receive Ultra Wide Band ("UWB") signals, the plurality of anchor points provided within the environment to define a first area wherein the task is to be performed; and an automaton configured to perform the task. The automaton includes a communication interface configured to transmit and receive the UWB signals to and from the anchor points, a controller configured to process the UWB signals and generate mapping information of the environment using the UWB signals, a first memory to store the mapping information, and a motor configured to provide the automation with mobility.

In another embodiment, a method for performing a task within an environment using an automaton includes generating first mapping information of a first area defined within the environment using signals received from one or more anchor points provided within the environment; and controlling the automaton to navigate within the first area to perform the task using second mapping information of the first area.

In yet another embodiment, a method for using an automaton includes controlling the automaton to perform a first task within a first area defined by a plurality of anchor points, the anchor points configured to transmit positional information to the automaton; generating first mapping information of the first area using the positional information received from the anchor points, the first mapping information including information on a location of a first obstacle provided within the first area; thereafter, controlling the automaton to navigate and perform a second task within the first area using the first mapping information; and generating second mapping information if a second obstacle is encountered while performing the second task.

As used herein, the term "automaton," "automatic device," or "robot" refers to a self-operating device that is configured to execute a predetermined sequence of operations or respond to encoded instructions to perform one or more functions including automatically moving.

DETAILED DESCRIPTION OF THE INVENTION

The present embodiment relates to an automaton configured with location awareness capability. That is, the automaton is configured to move or navigate within a given environment by using its positional information and/or the positional information of objects in the environment. The present embodiment is described in the terms of an automatic cleaner, but the present invention is not limited to such a device. The automaton of the present invention may be used for many different functions and in many different environments. For example, the automaton may be used for painting, mowing, harvesting or any other functions where an automaton having location awareness capabilities is desirable.

Figure 1:
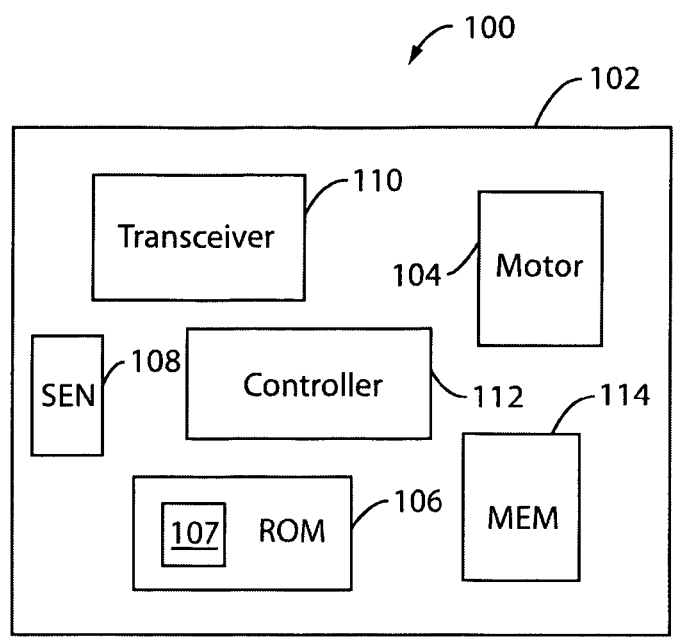
FIG. 1 shows a block diagram of an automaton according to one embodiment of the present invention.

FIG. 1 illustrates an automaton or automatic cleaner 100 according to one embodiment of the present invention. The automaton 100 includes a housing 102 enclosing various components, a motor 104 to provide locomotive power, a non-volatile memory 106, e.g., ROM, to store a program 107, a sensor 108 to detect objects, a transceiver to transmit and receive positional information, and a controller 112 to control the operation of the automaton including executing the program 107 and operating the motor 104. The program 107 includes instructions for a predetermined sequence of operations that enables the automaton to function as a self-operating device.

The housing also includes a memory 114 to store information received and to be transmitted via the transceiver 110. The memory may also store positional information obtained by the sensor or information input by the user. The memory may be volatile or non-volatile or may include both types of storage. The automaton also includes locomotive parts (not shown) coupled to the motor to provide the automaton with mobility. In the present embodiment, the locomotive parts are one or more wheels. The automaton may include a battery (not shown) to provide the motor with the necessary power, or a power cord to receive power from a power socket, or both.

Figure 2:
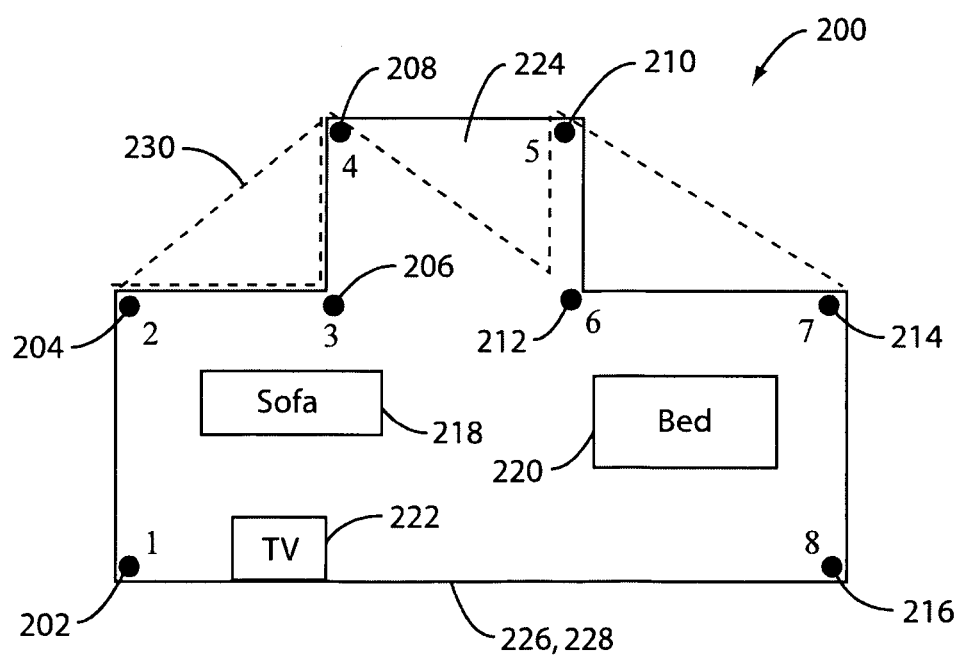
FIG. 2 illustrates a room provided with a plurality of anchor points to define a cleaning area according to one embodiment of the present invention.

FIG. 2 illustrates a room 200 provided with a plurality of anchor points 202–216 according to one embodiment of the present invention. The anchor points or reference points communicate with the automaton 100, i.e., the transceiver 110, to provide positional information to the automaton. The anchor points are configured to receive and transmit data and performs a function similar to the transceiver 110. However, they are referred to as either anchor points or reference points herein for illustrative purposes.

In the present embodiment, two or more two anchor points are used to specify the position of the automated machine 100. The communication technology used in the present embodiment is UWB. Accordingly, the anchor points and the transceiver are configured for UWB communication.

Ultra Wide Band ("UWB") is a series of very short electrical pulses, e.g., 0.5 nano-seconds, that exist on all frequencies simultaneously, unlike the traditional communication technology which uses a particular bandwidth. That is, UWB is just a blast of electrical noise. This blast of "noise" is converted to information by synchronizing the UWB receiver and transmitter. A UWB receiver is provided with the exact pulse sequence used by its corresponding transmitter, thereby making UWB very secure. In addition, because of the random nature of UWB timing schemes, the number of UWB signals that can share the same airwaves is virtually limitless.

The short duration keeps the duty cycle low (perhaps 0.5 percent) for the UWB devices when compared to the about 100 percent duty cycle of the spread spectrum devices. The low duty cycle of UWB devices results in low power consumption. In addition, the short-duration pulses virtually eliminates the multipath distortion that results from reflected signals arriving at the receiver slightly out of phase with a direct signal, thereby canceling or otherwise interfering with the clean reception. Accordingly, the UWB technology is particularly effective in indoor use.

The UWB technology has additional benefits. For example, the data transfer rate for UWB is enormous since it uses every frequency at the same time. UWB computer networks being developed now will initially operate at 40 to 60 megabits-per-second, or four to six times as fast as the most common networking technologies now in use. Researchers think that UWB networks may eventually run at speeds up to a gigabit-per-second, and therefore, should be able handle all the phone, television, and Internet traffic for any home or business. Since UWB radios do not interfere with each other, every home and business in the neighborhood can have its own gigabit.

One type UWB technology is impulse radio technology. Impulse radio refers to a radio system based on short, low duty cycle pulses. e.g., a short Gaussian monocycle. Impulse radio can use many types of modulation, including AM, time shift (also referred to as pulse position) and M-ary versions. The time shift method has simplicity and power output advantages that make it desirable, as explained in U.S. Pat. No. 6,469,628, which is incorporated by reference.

The UWB technology enables measurements of distance to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength--potentially, down to the noise floor of the system. This time position measurement can be used to measure propagation delay to determine link distance, and once link distance is known, to transfer a time reference to an equivalently high degree of precision.

Figures 3, 4:
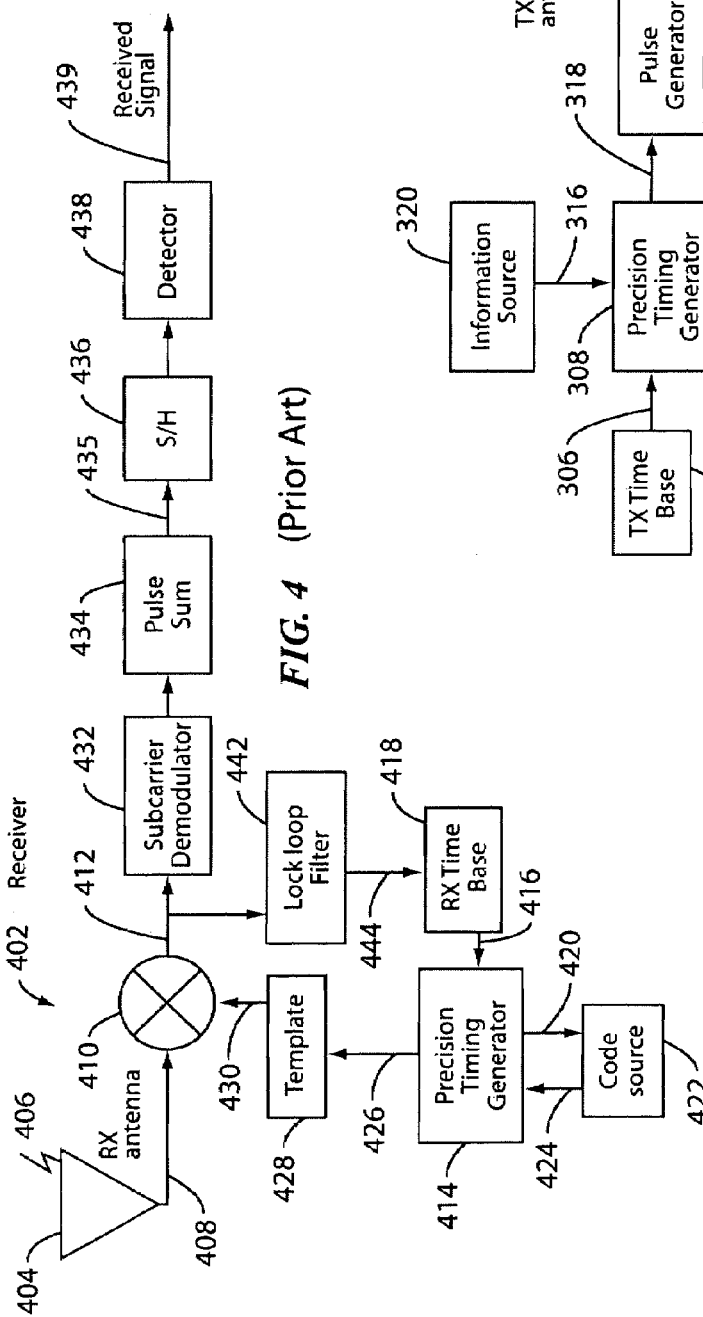
FIG. 3 illustrates a block diagram of a transmitter used in the UWB technology according to one embodiment of the present invention.
FIG. 4 illustrates a block diagram of a receiver used in the UWB technology according to one embodiment of the present invention.

FIG. 3 illustrates an exemplary impulse radio transmitter 302 of an impulse radio communication system. The transmitter 302 includes a time base 304 that generates a periodic timing signal 306. The time base 304 typically comprises a voltage controlled oscillator (VCO), .or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 306 is supplied to a precision timing generator 308.

The precision timing generator 308 supplies synchronizing signals 310 to the code source 312 and utilizes the code source output 314 together with an internally generated subcarrier signal (which is optional) and an information signal 316 to generate a modulated, coded timing signal 318. The code source 312 comprises a storage device such as a random access memory (RAM), read only memory (ROM), or the like, for storing suitable codes and for outputting the PN codes as a code signal 314. Alternatively, maximum length shift registers or other computational means can be used to generate the codes.

An information source 320 supplies the information signal 316 to the precision timing generator 308. The information signal 316 can be any type of intelligence, including digital bits representing voice, data, imagery, or the like, analog signals, or complex signals.

A pulse generator 322 uses the modulated, coded timing signal 318 as a trigger to generate output pulses. The output pulses are sent to a transmit antenna 324 via a transmission line 326 coupled thereto. The output pulses are converted into propagating electromagnetic pulses by the transmit antenna 324. In the present embodiment, the electromagnetic pulses are called the emitted signal, and propagate to an impulse radio receiver 402 (FIG. 4) through a propagation medium, such as air, in a radio frequency embodiment.

FIG. 4 illustrates an exemplary impulse radio receiver 402 for the impulse radio communication system. The receiver 402 includes a receive antenna 404 for receiving a propagated impulse radio signal 406. A received signal 408 is input to a cross correlator or sampler 410 via a receiver transmission line, coupled to the receive antenna 404, and producing a baseband output 412.

The receiver 402 also includes a precision timing generator 414, which receives a periodic timing signal 416 from a receiver time base 418. This time base 418 is adjustable and controllable in time, frequency, or phase, as required by the lock loop in order to lock on the received signal 408. The precision timing generator 414 provides synchronizing signals 420 to the code source 422 and receives a code control signal 424 from the code source 422. The precision timing generator 414 utilizes the periodic timing signal 416 and code control signal 424 to produce a coded timing signal 426. The template generator 428 is triggered by this coded timing signal 426 and produces a train of template signal pulses 430 ideally having waveforms substantially equivalent to each pulse of the received signal 408. The code for receiving a given signal is the same code utilized by the originating transmitter to generate the propagated signal. Thus, the timing of the template pulse train matches the timing of the received signal pulse train, allowing the received signal 408 to be synchronously sampled in the correlator 410. The correlator 410 ideally comprises a multiplier followed by a short term integrator to sum the multiplier product over the pulse interval.

The output of the correlator 410 is coupled to a subcarrier demodulator 432, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 434. A digital system embodiment is shown in FIG. 4. In this digital system, a sample and hold 436 samples the output 435 of the pulse summation stage 434 synchronously with the completion of the summation of a digital bit or symbol. The output of sample and hold 436 is then compared with a nominal zero (or reference) signal output in a detector stage 438 to determine an output signal 439 representing the digital state of the output voltage of sample and hold 436.

The baseband signal 412 is also input to a lowpass filter 442 (or lock loop filter). A control loop comprising the lowpass filter 442, time base 418, precision timing generator 414, template generator 428, and correlator 410 is used to generate an error signal 444. The error signal 444 provides adjustments to the adjustable time base 418 to time position the periodic timing signal 426 in relation to the position of the received signal 408.

In the present embodiment, the transceiver 110 and anchor points 202–216 share one or more parts of the components of the transmitter 302 and receiver 402 for economy. Examples of the components that may be shared include the time base 418, precision timing generator 414, code source 422, antenna 404, and the like.

Figure 5:
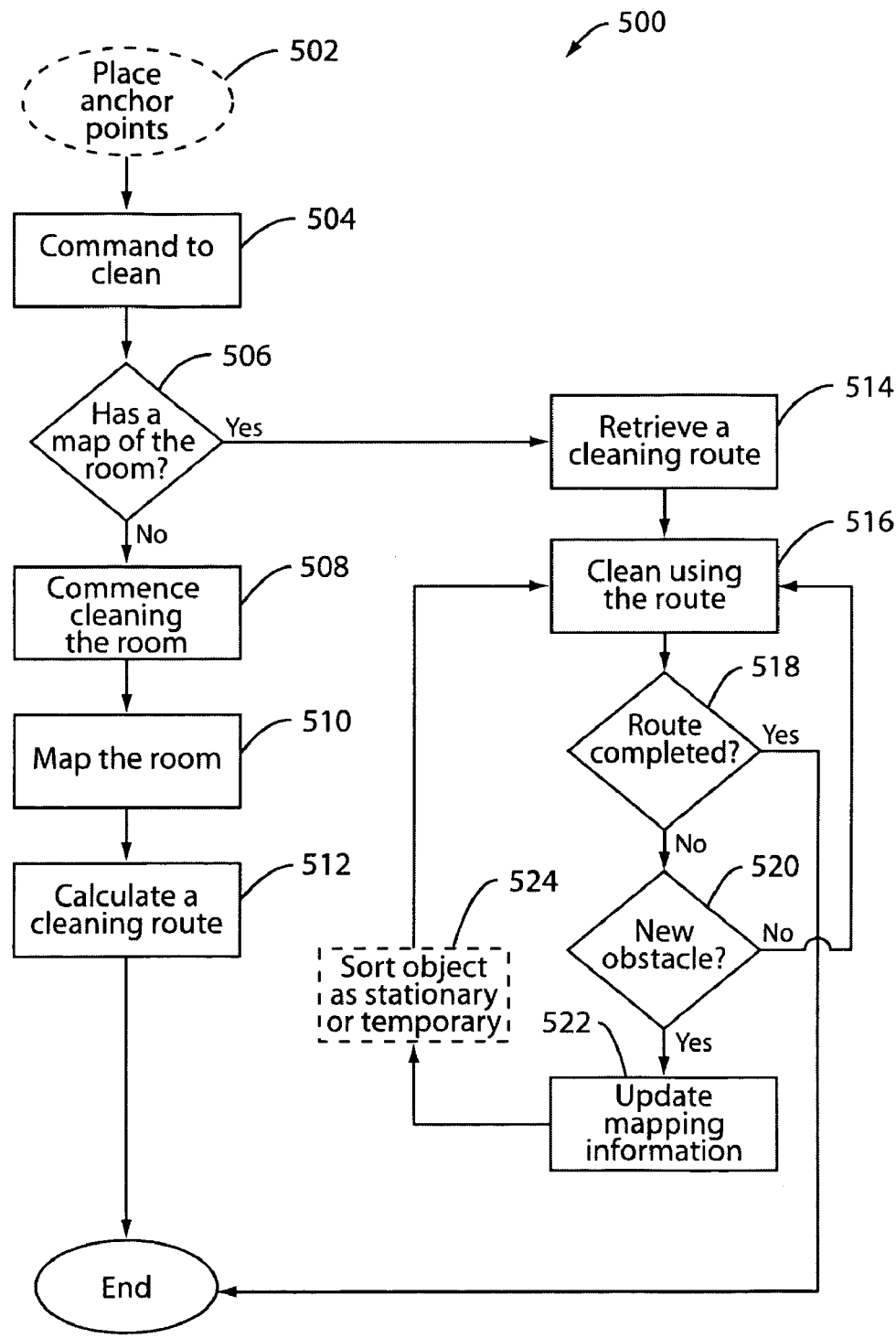
FIG. 5 illustrates a flow chart of a cleaning process using an automaton according to one embodiment of the present invention.

FIG. 5 shows a process 500 for cleaning the room 200 (FIG. 2) according to one embodiment of the present invention. A plurality of the anchor points 202–216 are placed in the room to define an area that a user wishes the automatic cleaner 100 to sweep (step 502). This step is performed by a user and is not part of the software algorithm. A command to clean the room is inputted to the automatic cleaner 100 (step 504). The command may be inputted according to a prescheduled time or a manual input by a user. The anchor points are also activated at this time as well. The anchor points are in a standby mode to conserve power prior to being activated. They may be activated by the cleaner, another device, or the user. The cleaner determines if it has a map of the room to be cleaned by accessing its memory 114 (step 506). Alternatively, the user may provide information as to whether the cleaner should use a given map or start "fresh" without relying on any map.

If the cleaner determines an appropriate map does not exist or the user instructs it to clean the room without using a predetermined map, the cleaner 100 commences cleaning the room using any given algorithm including a "brute force" approach (step 508). In a brute force approach, the cleaner moves to any open path and cleans the corresponding area. As it moves about the room, the automatic cleaner 100 senses and memorizes the locations of the obstacles, e.g., a sofa 218, a bed 220, or a television 222, that it encounters (step 510). The UWB technology provides precise positional information of the obstacles since it enables measurements of distance to extremely fine resolution because of the absence of multi-cycle ambiguity, thereby allowing positive determination of the waveform position to less than a wavelength. The mapping information of the room is stored in the memory 114 of the cleaner 100. Alternatively, the room may be scanned for locations of the obstacles prior to cleaning the room. Once all the obstacles in the room have been mapped, the cleaner calculates a cleaning route and stores it for use the next time it is asked to clean the room (step 512).

Referring back to step 506, if the cleaner determines that it has mapping information of the room 200, it retrieves a cleaning route associated with the room (step 514). Alternatively, the cleaner may generate a cleaning route at step 514 at this time using the mapping information of the room rather than using a stored cleaning route. The cleaner 100 commences cleaning the room using the cleaning route (step 516). A cleaner ends the cleaning process 500 if the cleaning route is completed (step 518).

While completing the cleaning route, if the cleaner finds a new obstacle, (step 520), the mapping information is updated (step 522). For this purpose, the cleaner determines the size or dimension of the new obstacle by moving around the edges of the new obstacle. The location and dimension information (i.e., positional information) of the new obstacle is stored in the memory 114 of the cleaner. The cleaner then proceeds and completes the cleaning route. In one embodiment, the cleaner 100 calculates a new cleaning route using the positional information of the new obstacle and stores the new cleaning route in the memory 114 and uses this new cleaning route to complete the cleaning process.

As used herein, a new obstacle is deemed to have been located if the mapping information for the room needs to be updated. For example, a new obstacle is deemed to have been found if a previous obstacle, e.g., the sofa 218, is moved to a new location or removed entirely from the room or if a book (not shown) is dropped on the floor. In one embodiment, the new obstacle is optionally categorized as a "stationary" object or a "temporary" object (step 524), as explained in more detail later. Generally, the stationary object is that which is placed in a given position for extended time (e.g., the bed 220), and the temporary object is that which is placed temporarily in a given position (e.g., a dropped book).

Referring back to step 502 and FIG. 2, the anchor points 202–216 are placed at various locations in the room 200 to define an area to be cleaned by the cleaner 100 according to one embodiment of the present invention. The anchor points are preferably placed at higher positions, so that the signals are not attenuated by the obstacles. The automatic cleaner cleans the area defined within the anchor points.

The anchor points can be used to set artificial boundaries within the same room, so the cleaner only cleans certain areas while not cleaning other areas of the room. For example, if a baby is sleeping on a first area 224 of the room, the anchor points 208 and 210 may be turned off, so that the remaining anchor points 202, 204, 206, 212, 214, and 216 define a new cleaning area that excludes the first area 224. The cleaner 100 will not enter the first area 224 even if there is no physical object blocking the access. Such a flexibility is not available with the conventional automatic cleaners, such as, Roomba™, that use only a brute force approach and move and clean any area that is not physically blocked off.

In one embodiment, the anchor points are provided at corners of an area to be cleaned. Each anchor point is given an identification number. The anchor points are placed on the corners according to their numerical orders. As shown in FIG. 2, the anchor points are given numbers 1–8 and are placed around the room in sequence, thereby defining a cleaning area 226, represented by a solid line 228. If the anchor points are not placed around in sequence, the cleaner may mistakenly think the cleaning area 226 is defined by a doted line 230.

Figure 8:
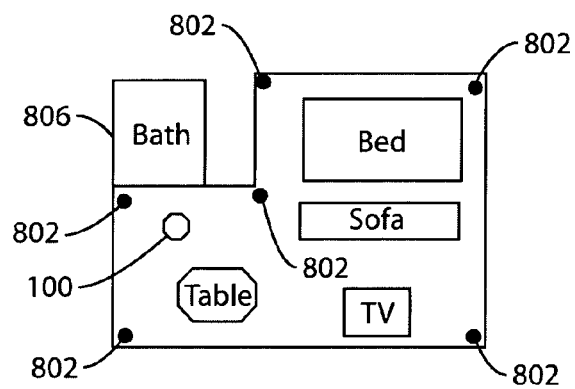
FIG. 8 shows a room provided with a plurality of anchor points to define a cleaning area that excludes a bathroom according to one embodiment of the present invention.

Referring to FIG. 8, a plurality of anchor points 802 are used to define a cleaning area for the cleaner 100 that excludes a bathroom 806. Accordingly, the user does not have to worry about closing the bathroom door to prevent the cleaner from entering the bathroom.

Figure 6:
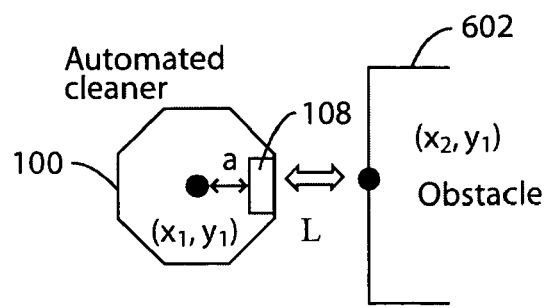
FIG. 6 illustrates a method of obtaining positional information of an object encountered by an automaton according to one embodiment of the present invention.

Referring back to step 510 of the process 500 and FIG. 6, the UWB technology is used to define the position of the obstacles encountered during the cleaning process according to one embodiment of the present invention. FIG. 6 illustrates the automated cleaner 100 having the sensor 108 provided next to an object 602. The sensor may be an ultrasonic sensor or a collision detection sensor. The position of the cleaner 100 is known at all times using the UWB technology. The position of the transceiver 110 of the cleaner 100 is given as $(x_1, y_1)$. The position of the obstacle is presumed to be $(x_2, y_1)$. Accordingly, the position of the obstacle 602 is determined by determining $x_2$, as follows: $x_2 = x_1 + a + L$, where "a" is the length between the senor and the transceiver 110, and "L" is a range of the sensor detection. If the sensor 108 is a collision detection sensor, then "L" is zero. In another embodiment, the position of the obstacle may be defined by using only the positions of the cleaner as it moves around the obstacle. Accordingly, the cleaner needs only to remember its own positions are it moves about the room to clean, whereby obstacles are encountered and avoided.

Figure 7A:
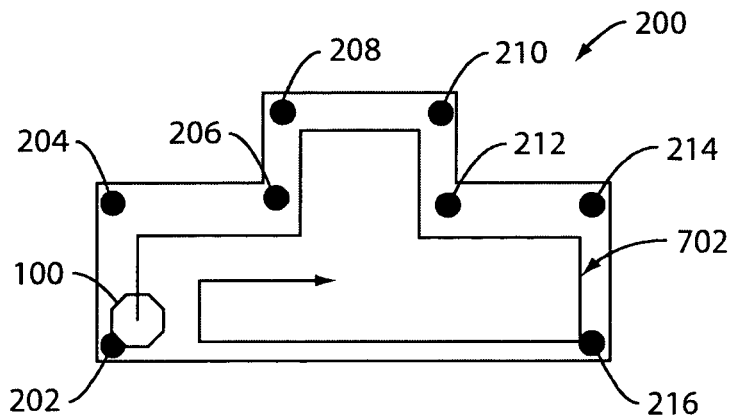
FIGS. 7A–7D illustrate exemplary cleaning routes an automaton may perform according to embodiments of the present invention.

Referring back to step 512, the cleaner may calculate a number of different cleaning routes according to the present embodiment. FIG. 7A illustrates a first cleaning route 702. The cleaner 100 moves from the first anchor point 202 to the second anchor point 204, and so on around the room in sequence following the ascending order of the identification number of the anchor points. The cleaner 100 starts from the outer sides of the room and moves progressively inward each time it returns to its starting position.

Figure 7B:
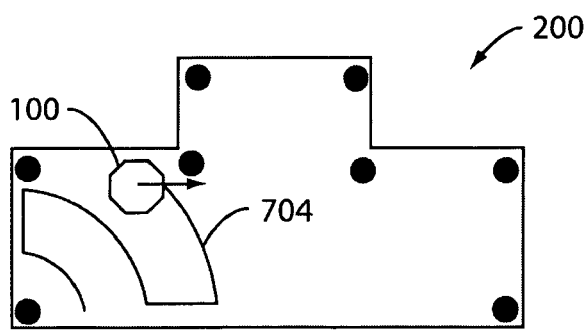

FIG. 7B illustrates a second cleaning route 704. The cleaner sweeps the area, so that the distance between the cleaner and a designated point (e.g., a socket of the power cable) is constant. This route may be used if the length of the power cable is not long enough for the cleaner to perform the first cleaning the route. Under this method, the cleaner sweeps the room by making an arc that progressively increases in radius until the cleaner reaches the farthest possible points.

Figure 7C:
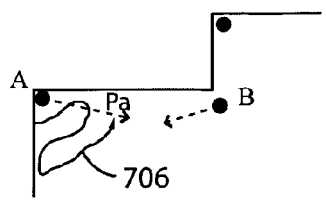

FIG. 7C illustrates a third cleaning route 706. The cleaner 100 sweeps areas in a first pattern near an anchor point A with the greatest reception power until the cleaner reaches a position where the received power from an anchor point B is greater than that of the anchor point A. Thereupon, the cleaner sweeps about the anchor point B in a second pattern. The first and second patterns may be the same or different. The cleaner than moves on to the area near an anchor point C when the power from that anchor point becomes greater than the anchor point B, and so on. In one embodiment, each anchor point is associated with a given cleaning pattern that the cleaner is instructed to use when sweeping about that anchor point.

Figure 7D:
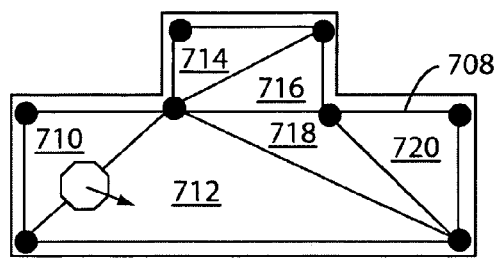

FIG. 7D illustrates a fourth cleaning route 708. The room is defined into a plurality of sections 710–720. In one embodiment, the room is divided into several triangles formed by three anchor points. Each section is cleaned using a given algorithm. Once a section, e.g., the section 710, has been cleaned, another section, e.g., the section 712, is then cleaned, and so on. The cleaner may use the same algorithm to clean all the sections or use different algorithms for certain sections to customize to their shapes. For example, the section 710 may be cleaned using the first algorithm 702 and the second section may be cleaned using the second algorithm 704.

Many other cleaning routes may be calculated and implemented by the cleaner using its location awareness capability. For example, the route may be calculated to minimize the overlap of the traces or to minimize the gross traces. The cleaner may also be configured to be aware of its remaining battery power if it is operating using battery power, so that the calculated route reflects the an efficient use of the available battery power. For example, if the cleaner determines that it has only 10 minutes of battery power, it would calculate a route that can be completed in 10 minutes. In one embodiment, the calculated route ends near a power supply, e.g., a battery charger, so that the automaton may be conveniently recharged. In another embodiment, the calculated route ends so that the automaton docks itself into a docketing station to recharge its battery, where the docking station is connected to a power supply such as a power socket.

Referring back to step 524, the obstacles encountered by the cleaner 100 during its cleaning process is categorized as "stationary obstacles" or "temporary obstacles." The stationary obstacles are objects that stay in given positions for extended time. These stationary obstacles generally includes a television, sofa, bed, and the like. The temporary obstacles are those objects that stay in given positions for short periods of time. These temporary obstacles generally includes toys, cats, people, and the like. The cleaner calculates a new cleaning route if a new stationary obstacle is identified or if the existing stationary obstacle is not found in the previous location. In one embodiment, the cleaner continues using the existing cleaning route if only a temporary obstacle is identified. The location of the temporary obstacle is noted in the memory 114 of the cleaner.

In one embodiment, the cleaner categorizes the obstacles into "temporary" or "stationary" based on the past operation. For example, the cleaner initially categories all new obstacles that it encounters as "temporary." If the same obstacle is found at the same position for the past N (e.g., 5) cleaning operations, it is switched from "temporary" to "stationary." A user may set N to be any suitable number.

In another embodiment, if the cleaner encounters a new obstacle, the cleaner may ask, "What is this? Is this temporary? If so clean up!." If a person in the room responds that the obstacles is temporary, then the cleaner simply evades the obstacle and continues cleaning the room. The cleaner may or may not store the positional information of this temporary obstacle.

Figure 9:
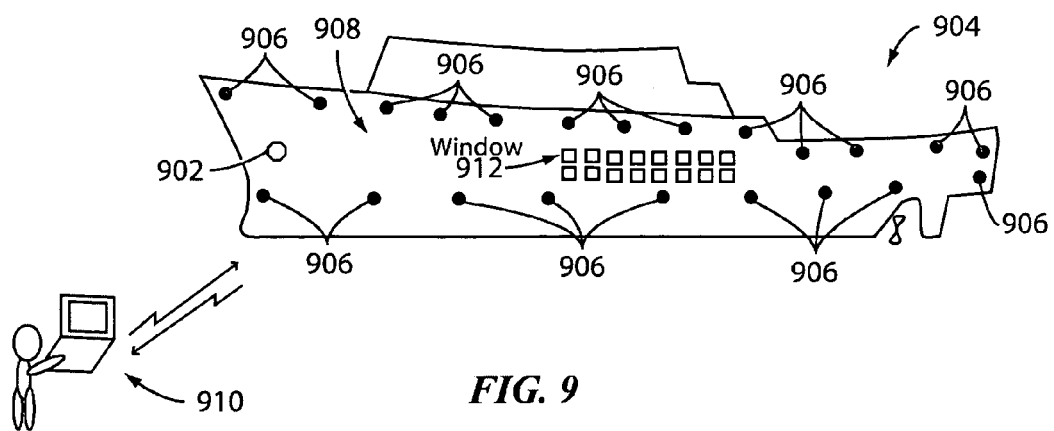
FIG. 9 illustrates an automaton placed on a ship to paint the ship according to one embodiment of the present invention.

FIG. 9 illustrates an automaton 902 placed on a ship 904 for painting the exterior of the ship according to one embodiment of the present invention. A plurality of anchor points 906 are placed on the ship to define a painting area 908. A remote controller 910 may be operated by a user to control the automaton 902 more precisely at certain parts of the ship, e.g., near windows 912.

The present invention has been described using specific embodiments. Various modifications or changes to the specific embodiments may be made without departing from the scope of the present invention. Accordingly, the scope of the present invention is defined by the appended claims.

What is claimed is:

1. An automaton configured to perform a task, the automaton comprising:
a communication interface to communicate positional information with a plurality of anchor points provided within a given environment, the positional information enabling generation of mapping information of the given environment;
a motor to provide the automation with mobility;
a memory to store the mapping information; and
a controller to control the motor to enable the automaton to perform the task in the given environment using a task route that has been generated using the mapping information, wherein the automaton performs the task by scanning within a first area defined by the plurality of anchor points and updates the first mapping information when a given obstacle is encountered by the automaton while performing the task within the first area; and re-routes the automaton based on the updated first mapping information.

2. The automaton of claim 1, further comprising:
a sensor to detect an object provided within the given environment.

3. The automaton of claim 1, wherein the controller is configured to generate the mapping information using the positional information.

4. The automaton of claim 1, wherein the communication interface and the plurality of anchor points are Ultra Wide Band transceivers.

5. The automaton of claim 4, wherein the mapping information is generated remotely from the automaton.

6. The automaton of claim 1, wherein the automaton is an automatic cleaner.

7. The automaton of claim 1, wherein the automaton is configured to perform at least one of the following tasks: sweeping, vacuuming, mopping, mowing, and painting.

8. An automated system for performing a task in a given environment, the system comprising:
a plurality of anchor points configured to transmit and receive Ultra Wide Band ("UWB") signals, the plurality of anchor points provided within the environment to define a first area wherein the task is to be performed; and
an automaton configured to perform the task, the automaton including:
a communication interface configured to transmit and receive the UWB signals to and from the anchor points,
a controller configured to process the UWB signals and generate mapping information of the environment using the UWB signals,
a memory to store the mapping information, and
a motor configured to provide the automation with mobility, wherein said system performs the task by scanning within the first area and updates the first mapping information when a given obstacle is encountered by the automaton while performing the task within the first area; and re-routes the automaton based on the updated first mapping information.

9. The system of claim 8, wherein the controller is configured to generate a task route for performing the task in the given environment using the mapping information.

10. The system of claim 8, wherein the anchor points are provided with unique identification numbers.

11. The system of claim 8, wherein the anchor points are used to define a second area within the environment that is excluded from the first area, so that the task is not performed within the second area.

12. The system of claim 8, wherein the mapping information includes a task route for performing the task, or positional information on one or more objects provided within the first area, or both.

13. A method for performing a task within an environment using an automaton, the method comprising:
generating first mapping information of a first area defined within the environment using positional information relating to the first area, where the positional information is obtained by using signals exchanged between the automaton and one or more anchor points provided within the environment;
controlling the automaton to navigate within the first area to perform the task using second mapping information of the first area; and
generating a first task route using the first mapping information, the first task route being used by the automaton to navigate within the first area to perform the task, wherein the second mapping information includes the first task route and updating the first mapping information when a given obstacle is encountered by the automaton while performing the task within the first area; and re-routing the automaton based on the updated first mapping information.

14. The method of claim 13, wherein the anchor points are provided within the environment to define the first area.

15. The method of claim 13, further comprising:
determining position of an obstacle encountered within the first area using a communication interface provided in the automaton.

16. The method of claim 15, wherein the positional information is derived using the Ultra Wide Band technology, wherein the positional information includes information about the position of the obstacle.

17. The method of claim 13, further comprising:
categorizing the given obstacle as a temporary obstacle when the given obstacle is first encountered; and
categorizing the given obstacle as a stationary obstacle when the given obstacle is found in the same location while the automaton is performing the task at a later time.

18. A method for using an automaton, the method comprising:
controlling the automaton to perform a first task within a first area defined by a plurality of anchor points, the anchor points configured to transmit positional information to the automaton;
generating first mapping information of the first area using the positional information received from the anchor points, the first mapping information including information on a location of a first obstacle provided within the first area;
thereafter, controlling the automaton to navigate and perform a second task within the first area using the first mapping information; and
generating second mapping information if a second obstacle is encountered while performing the second task.

19. The method of claim 18, further comprising:
determining power available to the automaton, wherein the second mapping information is generated according to the available power.

20. The method of claim 18, further comprising:
determining power available to the automaton;
calculating whether the power determined to be available is sufficient to complete an initial task route obtained according to the first or second mapping information; and
generating a substitute task route if the calculation indicates that the available power is insufficient to perform the initial task route.

21. The method of claim 20, wherein the substitute task route ends proximate a power supply.

* * * * *